UNITED STATES PATENT OFFICE.

GEORGE W. CABLE, OF MARYSVILLE, CALIFORNIA.

CLEANER AND POLISH COMPOSITION.

1,415,866. Specification of Letters Patent. Patented May 16, 1922.

No Drawing. Application filed January 4, 1921. Serial No. 435,022.

*To all whom it may concern:*

Be it known that I, GEORGE W. CABLE, a citizen of the United States, residing at Marysville, in the county of Yuba and State of California, have invented certain new and useful Improvements in Cleaners and Polish Compositions; and I do declare the following to be a full, clear, and exact description of the invention, such as will enable others skilled in the art to which it appertains to make and use the same.

The present invention relates to a cleaner and polish composition, and the primary object of the invention is to provide a cleaner and polish for hard finished surfaces, baked enamel, baked paint or varnish, porcelain and the like, and is especially adapted for use upon automobiles.

The improved composition consists of a mixture of fruit juice, a hydrocarbon polishing substance, a grease and dirt absorbent, liquid thinning material and a suitable perfuming substance.

The specific ingredients of the composition are orange juice, kerosene, flour, water and eucalyptus oil.

In preparing the composition it is preferable to use the ingredients in about the following proportions—viz, One pint of orange juice,
One quart of kerosene,
2 pounds of flour,
6 quarts of water,
1 ounce of eucalyptus oil.

In preparing the composition it is preferable to first thoroughly mix together the orange juice and the kerosene. After this has been done the flour should be added and the mixture boiled for about ten minutes. The mixture should then be allowed to stand for about forty-eight hours to enable the flour to thoroughly absorb the orange juice and the kerosene. After this the water and eucalyptus oil should be added to the mixture and thoroughly stirred.

The purpose of the orange juice is to soften the grease and dirt on the surface to be cleaned, and it also acts as a drier on the kerosene which acts as a polishing substance. The flour containing a certain amount of the orange juice and kerosene serves to absorb the grease and the dirt from the surface to be cleaned, and inasmuch as it is not dissolved in the liquid ingredients of the composition, it may be easily rubbed off of the surface to be cleaned. The purpose of the water is to thin the composition and to prevent it from drying before the surface is thoroughly cleaned. The eucalyptus oil serves to overcome the more or less obnoxious odor of the kerosene and to give to the composition a more pleasing odor.

Before using the composition it should be thoroughly stirred or shaken, and the dirt and grit should be removed from the surface to be cleaned. The composition should be applied to the surface, a small area at a time preferably, by means of a piece of cheese-cloth or other similar material, and should be rubbed briskly into the surface until it is nearly dry. When nearly dry the surface should be rubbed with another piece of cheese-cloth or similar material. This final rubbing serves to polish the surface, but the composition should not be allowed to become thoroughly dry before such polishing takes place.

The composition is especially adapted for cleaning and polishing hard finished surfaces, such as baked enamel, baked paint or varnished surfaces, porcelain and the like, and is especially adapted for use upon automobiles. It has been found that any surface cleaned and polished with this preparation will hold its luster for an unusually long period of time.

Since the proportions of the ingredients of the composition may be varied without departing from the spirit of the invention, it is to be understood that this is permitted without departing from the scope of the appended claims.

I claim:

1. A cleaning and polishing composition consisting of fruit juice, a liquid polishing substance, a grease and dirt absorbent, a liquid thinning material, and a perfuming substance.

2. A cleaning and polishing composition consisting of orange juice, kerosene, flour, water, and eucalyptus oil.

3. A cleaning and polishing composition consisting of one pint of orange juice, one quart of kerosene, two pounds of flour, six quarts of water, and one ounce of eucalyptus oil.

In testimony whereof I have hereunto set my hand.

GEORGE W. CABLE.